(12) United States Patent
Segev et al.

(10) Patent No.: US 12,260,131 B2
(45) Date of Patent: Mar. 25, 2025

(54) COMMANDS SPLITTING BASED ON FLAT LOGICAL BLOCK ADDRESS AND SECURITY KEY

(71) Applicant: Western Digital Technologies, Inc., San Jose, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/357,743

(22) Filed: Jul. 24, 2023

(65) Prior Publication Data

US 2024/0370210 A1 Nov. 7, 2024

Related U.S. Application Data (60) Provisional application No. 63/499,569, filed on May 2, 2023.

(51) Int. Cl.
*G06F 3/06* (2006.01)

(52) U.S. Cl.
CPC ............ *G06F 3/0679* (2013.01); *G06F 3/061* (2013.01); *G06F 3/0659* (2013.01)

(58) Field of Classification Search
CPC ....... G06F 3/0679; G06F 3/061; G06F 3/0659
See application file for complete search history.

(56) References Cited

U.S. PATENT DOCUMENTS

| | | | |
|---|---|---|---|
| 7,036,057 B2 | 4/2006 | Wu | |
| 10,275,361 B2 | 4/2019 | Ish et al. | |
| 10,310,764 B2 | 6/2019 | Suzuki et al. | |
| 10,719,459 B2 | 7/2020 | Kowles et al. | |
| 2009/0043984 A1 | 2/2009 | Chang et al. | |
| 2010/0174860 A1 | 7/2010 | Kim | |
| 2018/0239697 A1 | 8/2018 | Huang et al. | |
| 2018/0292991 A1 | 10/2018 | Walker | |
| 2019/0042144 A1* | 2/2019 | Peterson | G06F 3/0635 |
| 2019/0163651 A1* | 5/2019 | Kowles | G06F 3/061 |
| 2019/0362081 A1* | 11/2019 | Kanno | G06F 21/602 |
| 2021/0390048 A1 | 12/2021 | Li | |
| 2022/0156001 A1 | 5/2022 | Anandan et al. | |
| 2023/0063407 A1* | 3/2023 | Chen | G06F 3/0679 |

FOREIGN PATENT DOCUMENTS

KR 20190006680 A 1/2019

* cited by examiner

*Primary Examiner* — Chie Yew
(74) *Attorney, Agent, or Firm* — PATTERSON + SHERIDAN, LLP (57) ABSTRACT

Improved automation can be achieved using command-parts. Rather than using a command to determine which key to use, command partitioning will generate a task-ID based on a key index table to determine what key to use. Based on the task-ID, an encryption engine (XTS) will know which key to use. The command is split into partitions with the same attributes. The amount of task-IDs created will equal the amount of partitions. Automation will be based on the task-IDs to create a completion for a host. The controller will then return to the key index table to count the completed commands and send the completion to the host.

20 Claims, 7 Drawing Sheets

|  | Start=0 | Start=1024 | Start=0 | Start=0 |
|---|---|---|---|---|
|  | NS1: Size = 1024 LBAs. Flat LBA = 0-1023 | NS1: Size = 4096 LBAs. Flat LBA = 4096-8191 | NS2: Size = 2048 LBAs. Flat LBA = 1024-3071 | NS3: Size = 1024 LBAs. Flat LBA = 3072-4095 |

COMMANDS SPLITTING BASED ON FLAT LOGICAL BLOCK ADDRESS AND SECURITY KEY

CROSS-REFERENCE TO RELATED APPLICATIONS

This application claims benefit of U.S. provisional patent application Ser. No. 63/499,569, filed May 2, 2023, which is herein incorporated by reference.

BACKGROUND OF THE DISCLOSURE

Field of the Disclosure

Embodiments of the present disclosure generally relate to improved automation using command-parts.

Description of the Related Art

Nonvolatile memory express (NVMe) solid state drives (SSDs) hold multiple sections that are divided by both security requirements and device partitioning. One type of partitioning is namespaces. In a namespace, the namespace will have a size equal to a number of logical block addresses (LBAs). The LBA will typically have a range that, if arranged linearly, would be a called a flat LBA (FLBA).

When a host command passes through the multiple sections of the FLBA and security, the data path may need different information for each both the FLBA and security, and both the FLBA and security information may be in different locations. The FLBA corresponds to the section table, while the security corresponds to the security range table. The simple automation of control-path to data-path per command is made very difficult if not impossible when needing to access multiple locations for a small amount of information.

In previous approaches, all partitioned commands were treated as an "exception" and were handled with less automation. The partitioned commands were handled manual leading to failed command execution amongst other issues. The main drawbacks of the approach is the significant performance degradation caused by the manual execution of the command.

Therefore, there is a need in the art for improved automation using command-parts.

SUMMARY OF THE DISCLOSURE

Improved automation can be achieved using command-parts. Rather than using a command to determine which key to use, command partitioning will generate a task-ID based on a key index table to determine what key to use. Based on the task-ID, an encryption engine (XTS) will know which key to use. The command is split into partitions with the same attributes. The amount of task-IDs created will equal the amount of partitions. Automation will be based on the task-IDs to create a completion for a host. The controller will then return to the key index table to count the completed commands and send the completion to the host.

In one embodiment, a data storage device comprises a memory device; and a controller coupled to the memory device, wherein the controller is configured to: receive a read command to read data from the memory device; obtain a flat logical block address (FLBA) and a security key for the read command; split the read command into a first part and a second part; allocate a part identification (ID) to the first part and the second part; process the first part; process the second part; and report completion of the read command to a host device after processing the first part and the second part.

In another embodiment, a data storage device comprises a memory device; and a controller coupled to the memory device, wherein the controller is configured to: receive a read command to read data from the memory device; search a section table to find a section matching a logical block address (LBA) and namespace (NS) of the read command; calculate a flat LBA (FLBA) for the read command; search a security table to find an entry matching the LBA and NS of the read command; calculate a key for the read command; split the command into a first portion and a second portion; allocate a part identification (ID) to the first portion; execute the first portion; and queue the second portion for execution.

In another embodiment, a data storage device comprises means to store data; and a controller coupled to the means for storing data, wherein the controller is configured to: receive a read command to read data from the means for storing data; partition the read command into a first part and a second part, wherein the partitioning is based upon flat logical block address (FLBA) and a security key; associate a first part identification (ID) with the first part and a second part ID with the second part; execute the first part; execute the second part; and report completion of the command after executing both the first part and the second part.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Improved automation can be achieved using command-parts. Rather than using a command to determine which key to use, command partitioning will generate a task-ID based on a key index table to determine what key to use. Based on the task-ID, an encryption engine (XTS) will know which key to use. The command is split into partitions with the same attributes. The amount of task-IDs created will equal the amount of partitions. Automation will be based on the task-IDs to create a completion for a host. The controller will then return to the key index table to count the completed commands and send the completion to the host.

Figure 1:
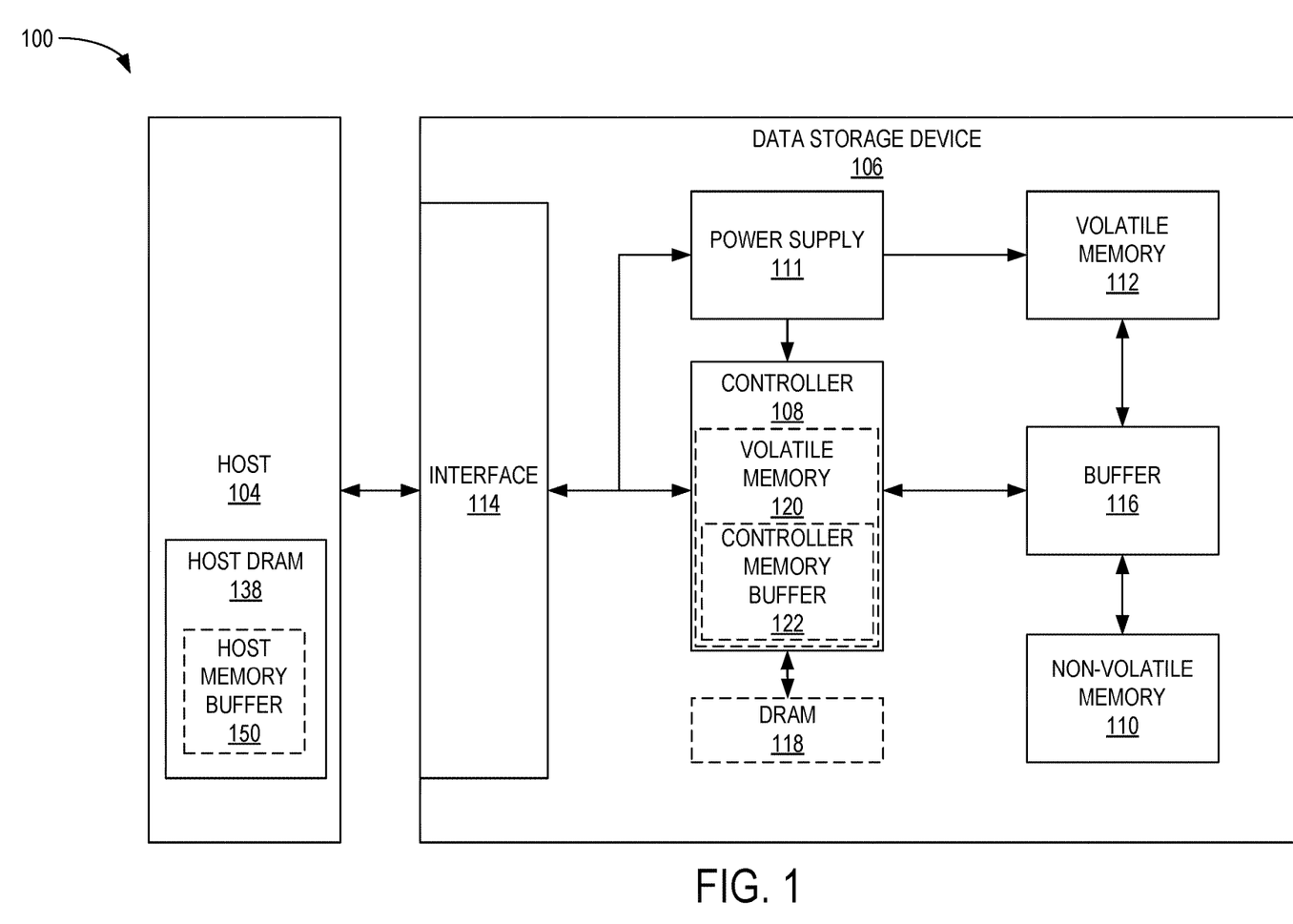
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
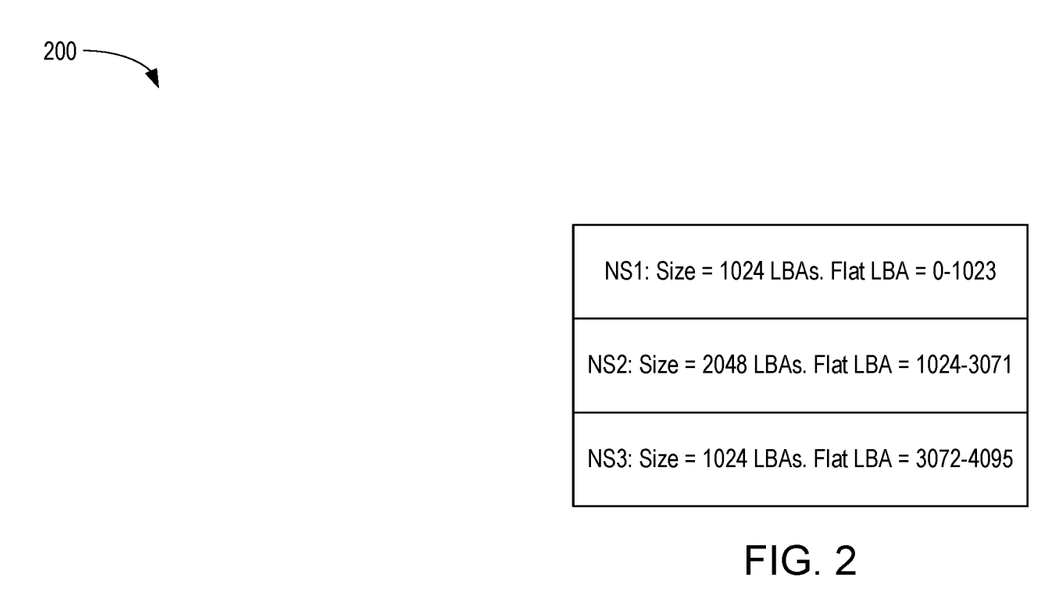
FIG. 2 shows example of a table of a simple NS and LBA to FLBA range, according to an exemplary embodiment.

FIG. 2 shows example of a table 200 of a simple namespace (NS) and logical block address (LBA) to flat LBA (FLBA) range, according to an exemplary embodiment. In table 200 there are three NSs, with NS1 having a size of 1024 LBAs, NS2 having a size of 2048 LBAs, and NS3 having a size of 1024 LBAs. The FLBA is taking all the NSs and arranging NSs on one line. Thus, in the case of FIG. 2, the FLBA for NS1 is from 0-1023, the FLBA for NS2 is 1024-3071, and the FLBA for NS3 is 3072-4095. The table 200 thus has 4096 LBAs in total. As each NS has LBAs mapped from 0 onwards (0 to 1023 as example for NS1), a mapping of NS+LBA to FLBA needs to be done.

Figure 3:
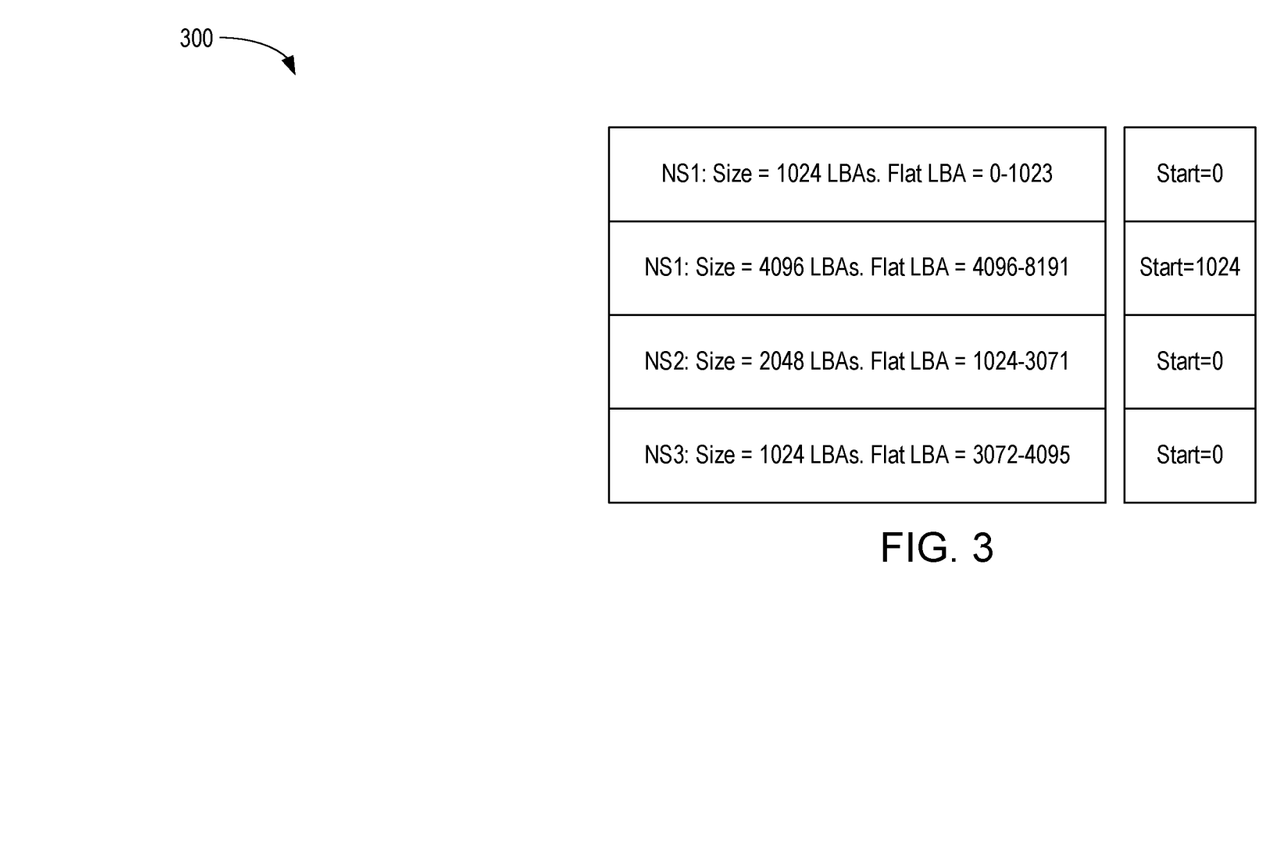
FIG. 3 shows example of a table with split NS and LBA to FLBA ranges, according to an exemplary embodiment.

FIG. 3 shows example of a table 300 with split NS and LBA to FLBA ranges, according to an exemplary embodiment. Following the previous example of FIG. 2, the first NS1 is increased to 5120 LBAs, but the LBAs are not continuous. NS1 holds two entries which are non-consecutive where the FLBA comes in mind. This partitioning might look much more complicated as more NSs are deleted and re-created. For NS1, the size is 5120 LBAs with the first portion of NS1 having a size of 1024 LBAs and a FLBA of 0-1023 with a start at 0. The second portion of NS1 has a size of 4096 LBAs and a FLBA of 4096-8191 with a start at 1024. The second namespace NS2 hasn't changed from FIG. 2 and thus has a size of 2048 LBAs and a FLBA of 1024-3071 with a start at 0. The third namespace, NS3, has a size of 1024 LBAs and a FLBA of 3072-4095 with a start at 0. Hence, the increase of NS1 occurs after the end of NS3 because NS2 and NS3 are already set, as is NS1, first portion. Thus, the increase of NS1 is added after NS3 and therefore begins at FLBA 4096 from the FLBA perspective. In terms of the start, because the second portion of NS1 is discontinuous with the first portion, the second portion must start after the first portion which would be at 1024.

Figure 4:
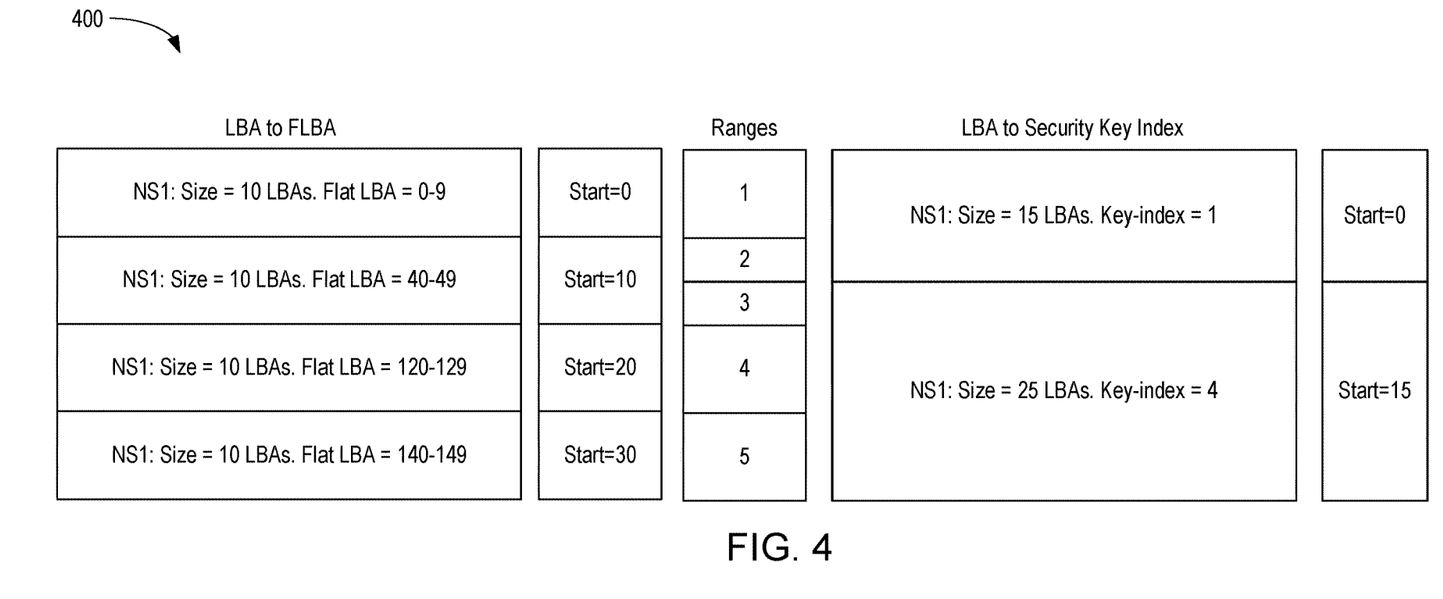
FIG. 4 shows example of a table of a simple NS/LBA pair to FLBA and NS/LBA pair to security-key-index with unaligned ranges, according to an exemplary embodiment.

FIG. 4 shows example of a table 400 of a simple NS/LBA pair to FLBA and NS/LBA pair to security-key-index with unaligned ranges, according to an exemplary embodiment. Just as each section has its own FLBA range in the device, so can different sections hold different security keys (used to encrypt/decrypt user data), and the sections are not always aligned. FIG. 4 shows a table 400 with a single NS with four portions. The first portion of NS1 has a size of 10 LBAs, a FLBA of 0-9, and starts at 0. The second portion of NS1 has a size of 10 LBAs, a FLBA of 40-49, and starts at 10. The third portion of NS1 has a size of 10 LBAs, a FLBA of 120-129, and starts at 20. The fourth portion of NS1 has a size of 10 LBAs, a FLBA of 140-149, and starts at 30. Hence, NS1 has 40 LBAs, and the FLBA is split into four separate sections on 10 LBAs each. For security reasons, the host device has divided NS1 into two ranges, 15 and 25 LBAs shown as NS1 first portion of LBA to security key index with a size of 15 LBAs and a key index of 1 and a start of 0, and NS1 second portion with a size of 25 LBAs and a key index of 4 with a start of 15. Due to unalignment between FLBA and key-index ranges there are 5 different combined ranges for (i.e., 1-5). Due to the arrangement of LBA to FLBA and the host arrangement, a read command of LBA 5 to LBA 16 will be split into three parts: LBA 5-LBA 9 with FLBA 5-9 and key 1; LBA10-LBA 14 with FLBA 40-44 and key 1; and LBA 15-LBA 16 with FLBA 45-45 and key 4.

Figure 5:
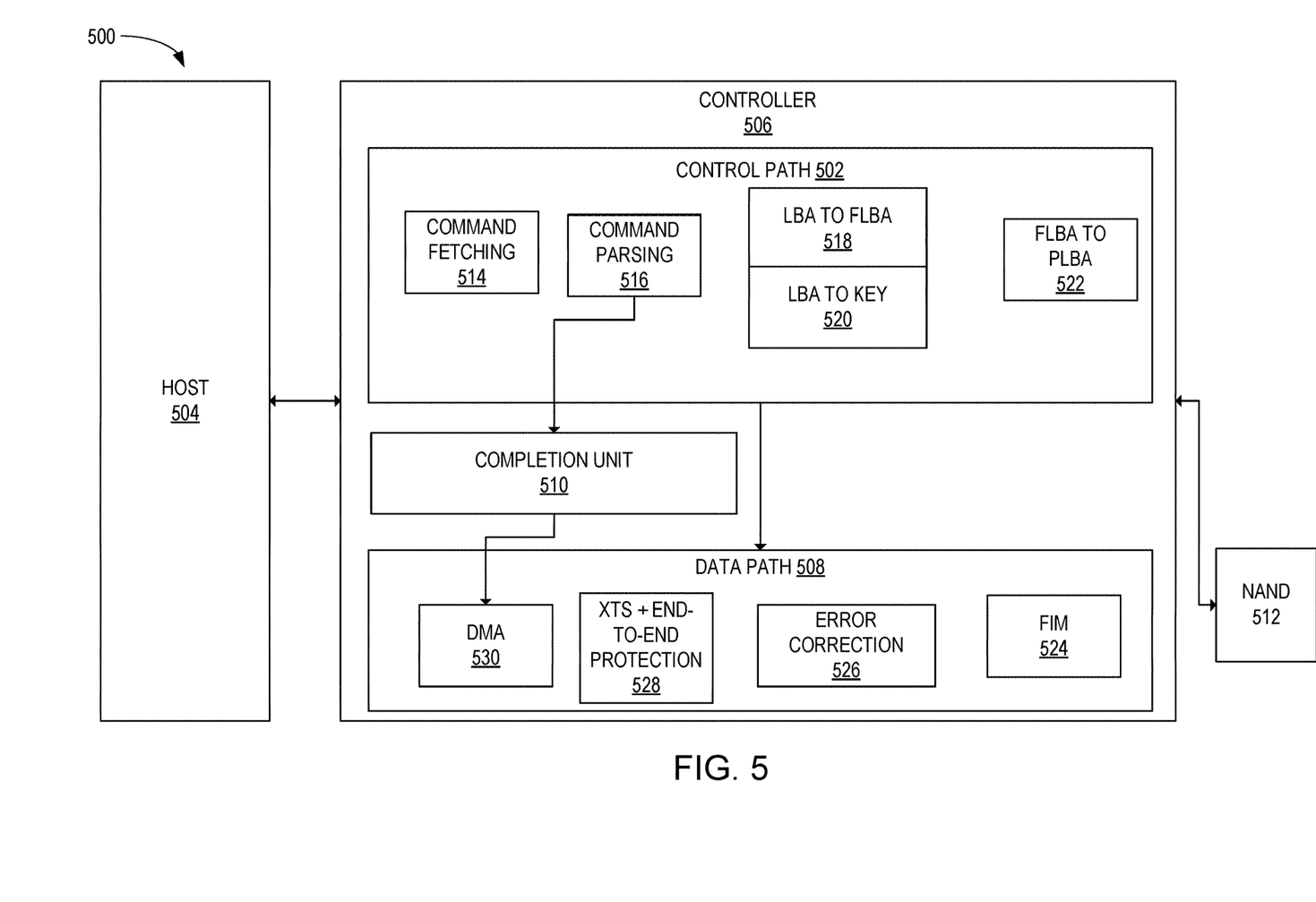
FIG. 5 is a schematic block diagram illustrating a storage system in which a controller has command acceleration functionality, according to certain embodiments.

FIG. 5 is a schematic block diagram illustrating a storage system 500 in which a controller 506 has command acceleration functionality, according to certain embodiments. The storage system 500 shows a host 504, a NAND 512, and a controller 506. In this example a read command (moving data from NAND 512 to the host 504) is used. The controller 506 shows two ranges which are a control path 502 and a data path 508. A completion unit 510 is present between the control path 502 and data path 508.

The data path 508 contains a flash interface module (FIM) 524 that brings data from the NAND 512. The data path 508 further contains some error correction capabilities in an error correction module 526 and an XTS 528 which uses the security key. There is end-2-end protection with XTS 528, which checks that nothing "went wrong" in bringing the correct data from NAND 512 using an FLBA. The data path 508 further contains a direct memory access module (DMA) 530, which writes the data to the host 504.

The control path 502 contains a command fetching unit 514 to read commands from the host 504. A command parsing unit 516 to check if the command is legal, and to classify the command (read, write, administrative). The control path 502 further contains LBA to FLBA module 518, and LBA to KEY module 520 as previously explained. The control path 502 further contains a FLBA to physical LBA (PLBA) module 522 (place in NAND) translation, using logical to physical (L2P) tables.

The completion unit 510 tracks the size of each command. While the command is parsed, the command size is stored in the completion unit 510. When the data is transferred, the expected size is decreased, and when the size reaches zero, a completion is sent to the host 504.

The data path 508 is built to meet bandwidth requirements. The control path 502 is built to meet key per input/output (KIPO) requirement. Each command will go through the LBA to FLBA module 518 and the LBA to KEY module 520 lookup tables. Once the control path 502 finishes parsing, the control path 502 triggers the data path 508 with the required information.

As discussed herein, using command parts for automation, instead of fully commands, is beneficial. The normal command will break into several sub parts if needed and each will also be associated with the original command to allow auto-completion based on the normal command and not based upon part of the command.

Figure 6:
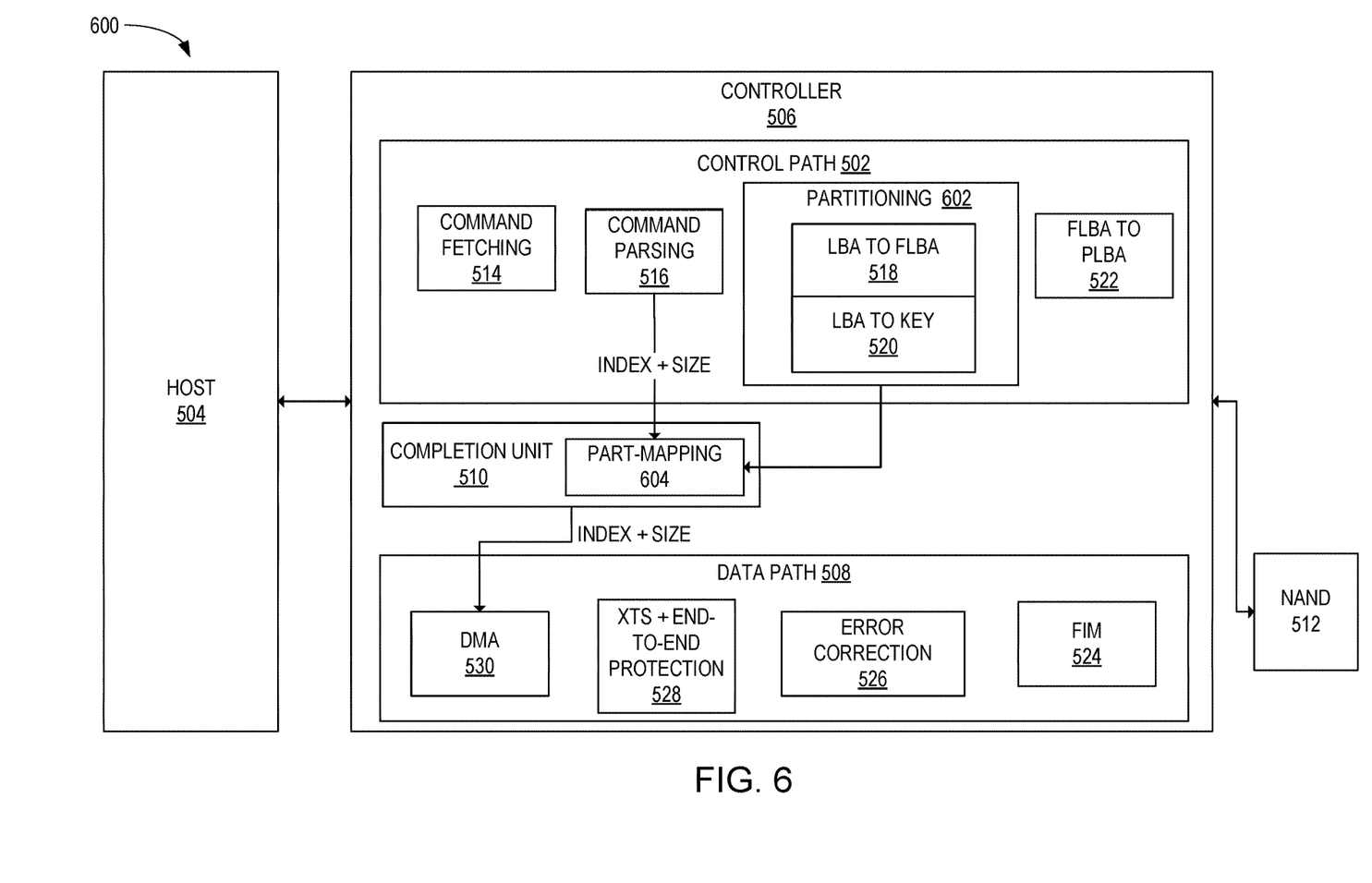
FIG. 6 is a schematic block diagram illustrating a storage system in which a controller has partitioning functionality, according to certain embodiments.

FIG. 6 is a schematic block diagram illustrating a storage system 600 in which a controller 506 has partitioning functionality, according to certain embodiments. Instead of using commands to tell the XTS 528 which key to use, task to task or part of a command can be used through partitioning. The controller 506 will have to generate task-IDs and the XTS 528 will know what key index to use based on the task-ID. FIG. 6 is similar to FIG. 5, but there are two changes. The first change is in the control path 502 where a partition logic unit 602 is added. In the completion unit 510 (i.e., command length database), a mapping table 604 is present between the part index and command index.

Figure 7:
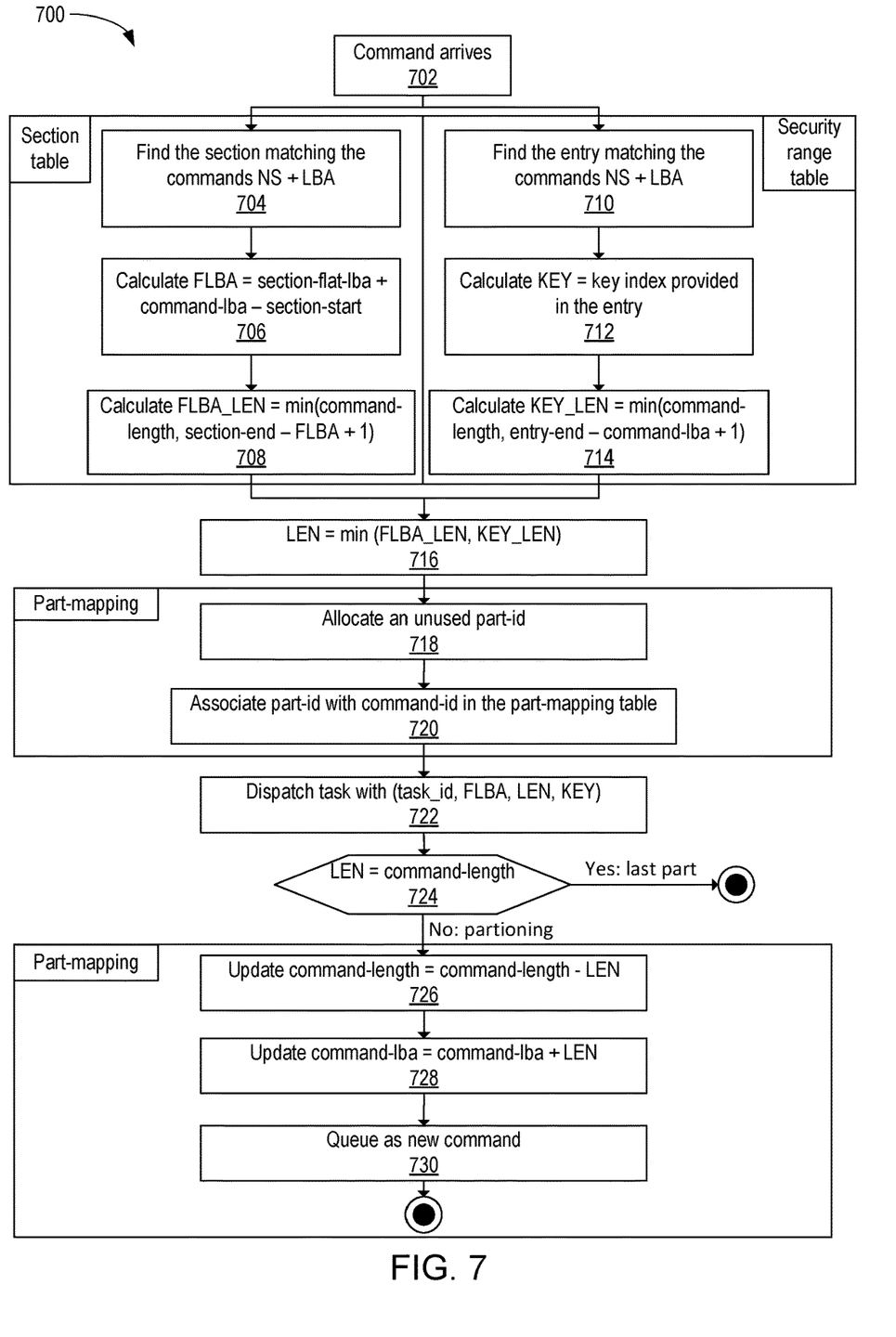
FIG. 7 is a flow chart illustrating a method for partitioning, according to certain embodiments.

FIG. 7 is a flow chart illustrating a method 700 for partitioning, according to certain embodiments. The method 700 works per command. First the controller, such as the controller 506 of FIG. 6, looks for section table and security range table entries that match the LBA of the command. The controller then extracts the FLBA and security keys in accordance with the command. The controller checks how much of the command the section table and the security table covers. When at most either of the tables can cover the entire command or the size of the command that fits into the relevant entry. The section table's effective size (FLBA_LEN) and the security table's range effective size (KEY_LEN) are then compared. The overall effective size (LEN) is the minimum between both. Then an un-used task-id is allocated, and the part-mapping logic (inside the completion database) is updated. The method 700 continues by dispatching the part of the command to the data-path engine such as the data path 508 of FIG. 6 for execution. If the part is the last (and possibly the only) part, the flow ends. Otherwise, the original command is manipulated to look smaller (without the dispatched part), and what remains is queued all over as a new command.

The partition algorithm updates the part-mapping block, such as the part-mapping 532 of FIG. 6, to associate the part-mapping block with a command length. Therefore, when the DMA, such as the DMA 530 of FIG. 6, sends 'X' flash memory unit (FMU) for task-ID there will be a request for the part-mapping to decrease the task-id length (as done with the command-ID before the suggested change, meaning no change in the flow for the DMA). The completion will decrease both the task-ID and the associated command-ID length by 'X'. If the task-ID length reaches zero, the task-ID is released back to the partitioning part for re-use. If the command-ID length reaches zero, the DMA is updated so auto-completion might be sent to the host.

The method 700 begins at block 702. At block 702, a command arrives to the controller, such as the controller for FIG. 6. The blocks (704-708) in the section table are completed in parallel with the blocks (710-714) in the security range table. At block 704, the controller finds the section matching the NS+LBA. At block, 706, the controller calculates the FLBA=section-flat-lba+command-lba−section-start. At block 708, the controller calculates the FLBA_LEN=min (command-length, section-end−FLBA+1).

At block 710, the controllers finds the entry matching the commands NS+LBA. At block 712, the controller calculates the KEY=key index provided in the entry. At block 714, the controller calculates KEY_LEN=min (command-length, entry-end−command-lba+1).

At the completion of both block 708 and block 714, the method 700 with proceed to block 716. At block 716, LEN=min (FLBA_LEN, KEY_LEN) is determined. Part-mapping contains block 718 and block 720. At block 718, the controller allocates an unused part-id. At block 720, the controller associates the part-id with the command-id in the part-mapping table. At block 722, the controller dispatches the task (task_id, FLBA, LEN, and KEY). At block 724, the controller determines whether LEN=command-length. If the controller determines LEN=command-length then the last part is completed of the method 700. If the controller determines LEN is not=command-length then portioning continues and the method 700 proceeds to block 726. Part-mapping contains block 726, block 728, and block 730. At block 726, the controller updates the command-length=command-length−LEN. At block 728, the controller updates the command-lba=command-lba+LEN. At block 730, the controller queues as a new command.

By splitting a command into multiple sub-parts, and associating each part with the original command, the data path and control path automation can be kept even for split-range commands at full bandwidth. In so doing, performance can be maintained through multi-range commands in enterprise applications.

In one embodiment, a data storage device comprises: a memory device; and a controller coupled to the memory device, wherein the controller is configured to: receive a read command to read data from the memory device; obtain a flat logical block address (FLBA) and a security key for the read command; split the read command into a first part and a second part; allocate a part identification (ID) to the first part and the second part; process the first part; process the second part; and report completion of the read command to a host device after processing the first part and the second part. The security key comprises a first security key and a second security key and wherein the first security key might be different from the second security key. The FLBA includes a discontinuous range. The FLBA, the security key, and the read command are associated with a single namespace (NS). The controller is configured to queue the first part and second part as separate commands for execution. The splitting occurs in a data path. The controller is further configured to associate the first part and the second part with the read command.

In another embodiment, a data storage device comprises: a memory device; and a controller coupled to the memory device, wherein the controller is configured to: receive a read command to read data from the memory device; search a section table to find a section matching a logical block address (LBA) and namespace (NS) of the read command; calculate a flat LBA (FLBA) for the read command; search a security table to find an entry matching the LBA and NS of the read command; calculate a key for the read command; split the command into a first portion and a second portion; allocate a part identification (ID) to the first portion; execute the first portion; and queue the second portion for execution. Searching the section table occurs in parallel with searching the security table. The FLBA is equal to a section FLBA plus a command LBA minus a section start. The controller is further configured to calculate a key length for the calculated key, wherein the calculated key length equals an entry end minus a command LBA plus 1. The controller is further configured to associate the part ID with a command ID in a part mapping table. The controller is further configured to determine whether the first portion is a last portion of the read command. The controller is further configured to update a command length to equal the command length minus a length of the first portion to generate the second portion. The controller is configured to update a command LBA to equal the command LBA plus the length of the first portion as part of generating the second portion. The controller is configured to queue the second portion as a new command where a repetitive process might yield a third (or more portions) portion, until the third (or more portion) portion is the last portion of the read command. The controller includes a completion database having a mapping table associating a part index of part IDs and command index of command IDs.

In another embodiment, a data storage device comprises: means to store data; and a controller coupled to the means for storing data, wherein the controller is configured to: receive a read command to read data from the means for storing data; partition the read command into a first part and a second part, wherein the partitioning is based upon flat logical block address (FLBA) and a security key; associate a first part identification (ID) with the first part and a second part ID with the second part; execute the first part; execute the second part; and report completion of the command after executing both the first part and the second part. The first part has a first security key and the second part has a second security key that might be different from the first security key. The first part has a first FLBA and the second part has a second FLBA and wherein the second FLBA and the first FLBA are not necessarily continuous.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   receive a command to read data from or write data to the memory device;
   obtain a flat logical block address (FLBA) and a security key for the command;
   split the command into a first part and a second part;
   allocate a part identification (ID) to the first part and the second part;
   process the first part;
   process the second part; and
   report completion of the command to a host device after processing the first part and the second part, wherein the security key comprises a first security key and a second security key and wherein the first security key is different from the second security key.

2. The data storage device of claim 1, wherein the FLBA includes a discontinuous range.

3. The data storage device of claim 1, wherein the FLBA, the security key, and the command are associated with a first namespace (NS).

4. The data storage device of claim 1, wherein the controller is configured to queue the first part and second part as separate commands for execution.

5. The data storage device of claim 1, wherein the splitting occurs in a data path.

6. The data storage device of claim 1, wherein the controller is further configured to associate the first part and the second part with the command.

7. A data storage device, comprising:
a memory device; and
a controller coupled to the memory device, wherein the controller is configured to:
- receive a read command to read data from the memory device;
- search a section table to find a section matching a logical block address (LBA) and namespace (NS) of the read command;
- calculate a flat LBA (FLBA) for the read command;
- search a security table to find an entry matching the LBA and NS of the read command;
- calculate a key for the read command;
- split the command into a first portion and a second portion;
- allocate a part identification (ID) to the first portion;
- execute the first portion; and
- queue the second portion for execution.

8. The data storage device of claim 7, wherein searching the section table occurs in parallel with searching the security table.

9. The data storage device of claim 7, wherein the FLBA is equal to a section FLBA plus a command LBA minus a section start.

10. The data storage device of claim 7, wherein the controller is further configured to calculate a key length for the calculated key, wherein the calculated key length equals an entry end minus a command LBA plus 1.

11. The data storage device of claim 7, wherein the controller is further configured to associate the part ID with a command ID in a part mapping table.

12. The data storage device of claim 7, wherein the controller is further configured to determine whether the first portion is a last portion of the read command.

13. The data storage device of claim 12, wherein the controller is further configured to update a command length to equal the command length minus a length of the first portion to generate the second portion.

14. The data storage device of claim 13, wherein the controller is configured to update a command LBA to equal the command LBA plus the length of the first portion as part of generating the second portion.

15. The data storage device of claim 14, wherein the controller is configured to queue the second portion as a new command where a repetitive process might yield a third or more portions until the third or more portions is the last portion of the read command.

16. The data storage device of claim 7, wherein the controller includes a completion database having a mapping table associating a part index of part IDs and command index of command IDs.

17. A data storage device, comprising:
means for storing data; and
a controller coupled to the means for storing data, wherein the controller is configured to:
- receive a read command to read data from the means for storing data;
- partition the read command into a first part and a second part, wherein the partitioning is based upon flat logical block address (FLBA) and a security key;
- associate a first part identification (ID) with the first part and a second part ID with the second part;
- execute the first part;
- execute the second part; and
- report completion of the command after executing both the first part and the second part.

18. The data storage device of claim 17, wherein the first part has a first security key and the second part has a second security key that is different from the first security key.

19. The data storage device of claim 17, wherein the first part has a first FLBA and the second part has a second FLBA and wherein the second FLBA and the first FLBA are not continuous.

20. The data storage device of claim 17, wherein the controller comprises a completion unit disposed between a control path and a data path.

* * * * *